United States Patent Office 3,817,906
Patented June 18, 1974

3,817,906
EPOXY RESIN COMPOSITION
Hideo Tsukioka, Mito, and Moriichi Sato and Kenichi Hondo, Hitachi, Japan, assignors to Hitachi, Ltd., Tokyo, Japan
Filed Feb. 7, 1972, Ser. No. 223,973
Claims priority, application Japan, Feb. 8, 1971, 46/4,699
Int. Cl. C08g 51/04
U.S. Cl. 260—37 EP          12 Claims

ABSTRACT OF THE DISCLOSURE

An epoxy resin composition for use as a coating to protect insulating materials against strongly corrosive gaseous decomposition products containing fluorine compounds, which comprises an epoxy resin based on glycidyl ether of bisphenol A admixed with a boron trifluoride-amine complex as the hardener, alumina and magnesium fluoride, both having a particle diameter of $100\mu$ or less, as the filler, and a thixotropic agent. The composition is semi-curable at room temperature, and on complete curing at high temperatures, it becomes a coating composition excellent in electric insulation. According to the purpose of application, the composition can also be admixed with a solvent for the epoxy resin to be applicable by spray coating.

BACKGROUND OF THE INVENTION

In recent years, gaseous fluorine compounds including sulfur hexafluoride have become widely used for insulating electrical equipments such as circuit breakers, transformers, etc. The main reason for this is that such gaseous insulating materials are excellent in insulating and arc-quenching properties and highly chemically stable, and can render small the size and weight of electrical equipments. However, even such chemically stable gaseous insulating materials are decomposed by a corona discharge generated in electrical equipments, to form decomposition products of high reactivity.

For instance, $SF_6$ forms, on decomposition by an arc-discharge, $SF_2$, $SF_4$, $S_2F_2$, $SOF_2$ $SOF_4$, $SO_2F_4$, etc. These decomposition products have a high reactivity and corrode other insulating materials. Since they corrode especially $SiO_2$, those insulators composed of thermosetting resins, such as polyesters, epoxides and the like, which are filled with glass, silica, or the like, are deteriorated in surface resistivity due to corrosion of said fillers, resulting in dielectric breakdown of the electrical equipments. Further, the mechanical strength thereof decreases with an excessive progress of corrosion. The present invention has been accomplished for the purpose of protecting the said insulators against the said corrosive decomposition products and of ensuring the safety of the electrical equipments which employ these insulators.

SUMMARY OF THE INVENTION

The first object of this invention is to provide a novel epoxy resin composition for insulation.

The second object of this invention is to provide an epoxy resin composition having excellent corrosion resistance.

The third object of this invention is to provide an epoxy resin composition having a thixotropic property.

The fourth object of this invention is to provide an epoxy resin composition which has a viscosity suitable for spray coating and shows thixotropy on coating.

The fifth object of this invention is to provide an epoxy resin composition which gives a coating layer without pinholes or voids.

The sixth object of this invention is to provide an epoxy resin composition suitable for coating resinous insulators which are filled with glass, silica, or the like.

The seventh object of this invention is to provide an epoxy resin composition which is semi-cruable at room temperature.

Other objects of this invention will be apparent from descriptions referring to Examples.

The present invention is characterized by an epoxy resin composition comprising an epoxy resin based on glycidyl ether of bisphenol A, a boron trifluorideamine complex as the hardener, alumina and magnesium fluoride as the filler, a thixotropic agent and a solvent.

BRIEF DESCRIPTION OF SEVERAL VIEWS OF THE DRAWINGS

In the accompanying drawing.

DETAILED DESCRIPTION

Figure 1:
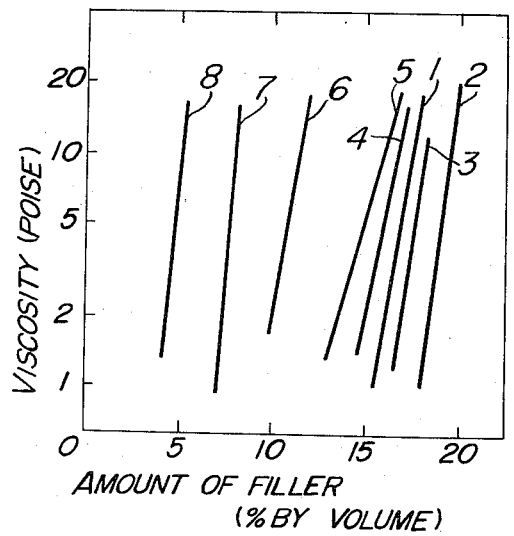
FIG. 1 is a curve representing relationships between the amounts of fillers and the viscosities of the epoxy resin compositions.

It is necessary for the epoxy resin composition of this invention to satisfy that in forming a coated layer on the surface of the said resinous insulating materials which are filled with silica, glass, or the like, neither pinholes nor voids are created in the coated layer, and that the viscosity is sufficiently low to permit spray coating which is most desirable in view of the convenience for application. It is further necessary that the thickness of the coated layer is at least $300\mu$ in order that the above-mentioned corrosive decomposition products cannot pass through the coated layer by permeation or diffusion to reach the resinous insulating materials before being caught by the adsorbent placed inside the equipments, and also that the coating composition has such a consistency that the coated material does not flow down and neither is the thickness of the coated layer made ununiform, during hardening.

The above-said two requirements are contradictory to each other and are difficult to satisfy at the same time. However, according to the present invention, these contradictory properties have been suitably brought under control by using a solvent and thixotropic agent. In order that the coating composition can be applied by spraying and is capable of forming a coated layer without pinholes and voids, the viscosity of the composition is kept in the range allowable for spray coating, that is, at about 20 poises or less, by addition of a solvent for decreasing the viscosity of the epoxy resin, in addition to the control of the amount of fillers, alumina and magnesium fluoride, which will be described hereinafter. Further, the evaporation rate of the solvent for use was taken into account in order that the coated layer may have a smooth surface and neither pinholes nor voids may be formed therein. Suitable solvents for the above purpose are those having a relative evaporation rate in the range of 0.3 to 6.0 when an epoxy resin is dissolved therein, the evaporation rate of n-butyl acetate being taken as unity. Such solvents include, in addition to n-butyl acetate, toluene, methyl ethyl ketone, methyl isobutyl ketone, benzene, xylene, etc. These may also be used in admixture.

In the second respect, a thixotropic agent has been added in order that after application the said epoxy resin composition does not flow down to make the film thin during hardening at room temperature and that a uniform coating having a thickness of at least $300\mu$ can be formed.

The thixotropic agent makes the said epoxy resin composition to assume a thixotropic gel structure and hence, after being applied, prevents the composition from flowing down and prevents the thickness of the coated layer from being made ununiform. Such thixotropic agents include conventionally used amide compounds (A-S-A T-25, Ito Seiyu Co., Japan), organic bentonites (Orben of Shiraishi Kôgyô Co., Japan and Bentone of National Lead Co., Japan), and aluminum stearate. At least one of these thixotropic agents is added in an amount of 0.2 to 5 parts by weight per 100 parts by weight of the epoxy resin.

In addition of the thixotropic agent in an amount greater than 5 parts by weight would not further improve the thixotropy. Since the thixotropy obtained by the use of a thixotropic agent alone was, nevertheless, insufficient, further studies were made to improve the thixotropy, and, as a result, it has been found that magnesium fluoride, which had been contemplated to be used as filler, has a pronounced thixotropic effect.

Moreover, magnesium fluoride has been found to show excellent resistance to corrosion due to the above-mentioned gaseous fluorine compounds such as, for example, decomposition products of $SF_6$. Magnesium fluoride for this purpose has preferably a particle diameter of 100μ or less, and is used in an amount in the range of 5 to 60 parts by weight per 100 parts by weight of the epoxy resin, depending upon the purpose of the use of the composition, to markedly increase the thixotropy of the composition. Though the reason why the thixotropy is improved by the addition of magnesium fluoride is not clear, it is presumable that the oil absorptivity of magnesium fluoride is responsible for the improvement. The extent of improvement in thixotropy of the composition by the use of said magnesium fluoride was investigated with the compositions containing varied amounts of magnesium fluoride. The blending ratio and the thixotropy obtained were as shown in Table 1. Thixotropies can be compared by means of a rotating viscosimeter by determination of the ratio of viscosities (thixotropic effect) at 60 r.p.m. and 6 r.p.m. at 30° C.

TABLE 1

| Thixotropic agent, A-S-A T-25, part | Magnesium fluoride, part | Alumina, part | Viscosity, poise (30° C., 60 r.p.m.) | Thixotropic effect |
|---|---|---|---|---|
| 2 | 0 | 130 | 9.2 | 4.2 |
| 2 | 25 | 105 | 8.9 | 6.3 |
| 2 | 40 | 90 | 8.8 | 8.0 |

The composition used to obtain the results shown in Table 1 was a mixture of 100 parts by weight of an epoxy resin based on glycidyl ether of bisphenol A (Epikote resin 815, Shell Chemical Co.), 25 parts by weight of a cycloaliphatic epoxy resin (Chissonox 221, Shin Nippon Chisso Co., Japan), 10 parts by weight of boron trifluoride-2,4-dimethylaniline complex, and 40 parts by weight of toluene.

As is clear from Table 1, thixotropy was improved markedly by the use of magnesium fluoride. Magnesium fluoride acts also as a filler similarly to alumina which will be described hereinafter. Accordingly, the use of a large amount of magnesium fluoride increases the viscosity of the composition. Therefore, it is used in an amount preferably in the range given above.

The epoxy resin for use in this invention has preferably a low viscosity to facilitate spray coating, as described before. Suitable for such an epoxy resin are those derived from glycidyl ether of bisphenol A having preferably an epoxy equivalent of 100 to 200, a molecular weight of 200 to 400, and a viscosity of 1 to 28 poises at 25° C. Another reason for using such a low viscosity epoxy resin is that a relatively low viscosity composition may be obtained even when large amounts of the fillers, i.e. alumina and magnesium fluoride are added.

It is also possible to accelerate the rate of hardening by addition of up to 40 parts by weight of an ordinary cycloaliphatic epoxy resin to the above-mentioned epoxy resin derived from glycidyl ether of bisphenol A so that the composition may not flow down and the thickness of the coated layer is not made ununiform, during semi-curing at room temperature. Such cycloaliphatic epoxy resins include 3,4-epoxycyclohexylmethyl 3,4-epoxycyclohexanecarboxylate, 3,4 - epoxy-6-methylcyclohexylmethyl 3,4-epoxy-6-methylcyclohexanecarboxylate, etc. The combined use of a cycloaliphatic epoxy resin is effective for accelerating the rate of hardening initiated by the hardener, boron trifluoride (hereinafter referred to as $BF_3$)-amine complex, which will be described below.

The hardeners for the above-said epoxy resins include customary amine-type hardeners such as, for example, diethylenetriamine, triethylenetetramine, tetraethylenepentamine, diethylaminopropylamine, and the like. However, in view of the electrical properties of the insulating structures after being coated, $BF_3$-amine complexes are more preferred. The reason for this is that as compared with the cvutomary amine-type hardener, the $BF_3$-amine complex is sufficiently effective when added even in an amount of about a half to a quarter as much, and the influence upon the electrical properties of the hardened coating composition may be presumed to be accordingly small. It is also desirable that the said composition is hardened to a certain degree at room temperature. Among $BF_3$-amine complexes, those which are effective at room temperature include $BF_3$-diphenylamine, $BF_3$-aniline, $BF_3$-2,4-dimethylaniline, etc. These $BF_3$-amine complexes are added in an amount of 3 to 15 parts by weight per 100 parts by weight of the said epoxy resin to accomplish the object. Considering the pot life of the said composition, it is desirable to add at least one of said $BF_3$-amine complexes immediately before using the coating composition. The hardening treatment begins with semi-curing at room temperature so that the composition applied does not flow down during heat-hardening, and then followed by heat-curing to complete the hardening.

The shaped product of the resin composition filled with silica or glass has a smaller thermal expansion coefficient than that of an unfilled composition. When an epoxy resin alone is coated, the coated layer is liable to be peeled away from the basis material at the interface or to be cracked during hardening treatment or subsequent heat cycle. Therefore, a filler is added to the coating composition as an attempt to approach the thermal expansion coefficient thereof to that of the insulating structure (basis material), hereby preventing the peeling and cracking. Such fillers include alumina, zinc oxide, titanium oxide, barium sulfate, iron oxide, aluminum fluoride, magnesium fluoride, calcium fluoride, calcium sulfate, and calcium carbonate. As mentioned above, it is necessary for the composition to have a viscosity of about 20 poises or less in order to be applicable by spraying. Consequently, those fillers which have little effect upon the viscosity of the composition are desirable. Therefore, the relationship between the amount of the above-said various fillers added and the viscosity of the composition has been determined. FIG. 1 shows relationships between the amount of the typical fillers and the viscosity. As is clear from FIG. 1, alumina (1), magnesium fluoride (2), calcium sulfate (3), calcium fluoride (4), and barium sulfate (5) show little effect upon the viscosity, whereas iron oxide (6), zinc oxide (7), and calcium carbonate (8) have a greater effect upon the viscosity. Alumina (1) and magnesium fluoride (2) is excellent as a thixotropic agent as mentioned before, and retards sedimentation of alumina used as a filler, resulting in a uniform composition.

The above-said alumina having a particle diameter of 100μ or less and containing up to 1% by weight of impurities such as silica, soda ($Na_2O$), titanium oxide, etc., is desirable. The amount of said alumina added is preferably 50 to 150 parts by weight per 100 parts by weight of the epoxy resin, with due allowance for the amount of magnesium fluoride. The addition of alumina in excess of 150 parts by weight causes so much increase in viscosity of the composition that the composition becomes unsuitable for spray coating, whereas the addition of less than 50 parts by weight has a comparatively small effect upon the above-said decrease in thermal expansion coefficient.

As already mentioned above in detail, by coating the composition on the surface of an insulator composed of a shaped product of a thermosetting resin, such as, for example, an epoxy resin or a polyester resin, containing silica or glass as a filler, the corrosion of said insulating material with the discharge-decomposition products of an insulating gaseous fluorine compound can be prevented when said insulator is used in an electrical equipment such as circuit breaker, transformer, or the like, containing said insulating gaseous fluorine compound sealed therein. The coating composition of this invention is characterized by being made suitable for spray coating by adjusting the blending ratios of ingredients of the composition and reducing the viscosity by the addition of a solvent. However, the composition of this invention can be applied not only by spray coating but also by other coating techniques including brush coating and dip coating according to purposes.

Example 1

In 100 parts by weight of an epoxy resin based on glycidyl ether of bisphenol A (Epikote resin 815, a product of Shell Chemical Co., having an epoxy equivalent of 180 and a viscosity of 6 poises at 25° C.), was dissolved 1 part by weight of an amide compound (A–S–A T–25, a product of Ito Seiyu Co., Japan) as a thioxtropic agent, while heating at 110° C., which was then admixed with 25 parts by weight of a cycloaliphatic epoxy resin (Chissonox 221, a product of Shin Nippon Chisso Co., Japan, having an epoxy equivalent of 134). After 90 parts by weight of alumina of up to $10\mu$ in particle diameter, and 40 parts by weight of magnesium fluoride of up to $100\mu$ in particle diameter as fillers were added thereto, and the resulting mixture was kneaded by means of a grinding mill. The mixture was further admixed with 40 parts by weight of toluene as a solvent and 10 parts by weight of $BF_3$-2,4-dimethylaniline as a hardener. The resulting coating composition was spray-coated by means of an air spray gun on an epoxy resin plate filled with silica (300 mm. x 300 mm. x 2 mm.-thickness).

The coated epoxy resin plate was semi-cured at room temperature for 24 hours and then heated at 120° C. for 4 hours to complete the hardening. Thus, there was obtained a coating of the above-said composition of about $300\mu$ in thickness, having a smooth surface without any pinhole or other defects.

Figure 2:
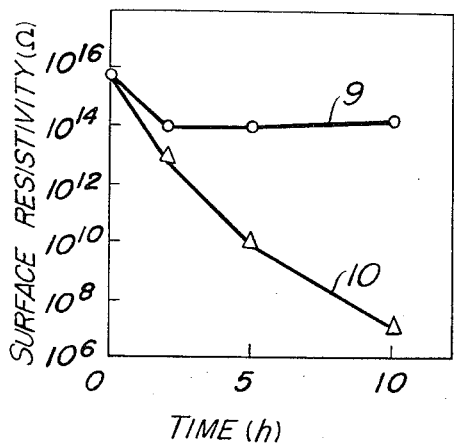
FIG. 2 is a curve representing changes in surface resistivity with the lapse of time, which serve to compare two insulator plates with each other in surface corrosion due to the discharge-decomposition products of $SF_6$.

A test specimen measuring 30 mm. x 10 mm. x 2 mm.-thickness was cut out of the above-obtained resin plate. Heavy coatings of the above-said coating composition were applied onto the cut surfaces of the test specimen, which specimen was then placed in a cabinet, which was then filled with $SF_6$ and sealed. After a continuous electric discharge was applied thereto by means of needle and plate electrodes, the coating was examined for its resistance to corrosion due to decomposition products of $SF_6$ by measuring changes in its surface resistivity with the lapse of time. For comparison, an uncoated resin plate was simultaneously tested. The results obtained were as shown in FIG. 2, wherein the curve 9 refers to the test specimen coated with the present composition and the curve 10 refers to the uncoated specimen. As is clear from FIG. 2, the test specimen coated with the composition in accordance with the present invention showed a little deterioration in surface resistivity and the coating thus proved to be excellent in corrosion resistance.

Example 2

100 parts by weight of an epoxy resin based on glycidyl ether of bisphenol A (Epikote 828 from Shell Chemical Co., having an epoxy equivalent of 190 and a viscosity of 12 poises at 25° C.), 3 parts by weight of a cycloaliphatic epoxy resin (Chissonox 206 of Shin Nippon Chisso Co., Japan, having an epoxy equivalent of 70) and 1 part by weight of an amide compound as a thixotropic agent were mixed. Then, to the mixture were added 80 parts by weight of alumina having a particle diameter of 3 to $20\mu$ and 40 parts by weight of magnesium fluoride having a particle diameter of up to $100\mu$. After having been thoroughly kneaded, the mixture was further admixed with 40 parts by weight of n-butyl acetate and 8 parts by weight of $BF_3$-2,4-dimethylaniline.

Figure 3:
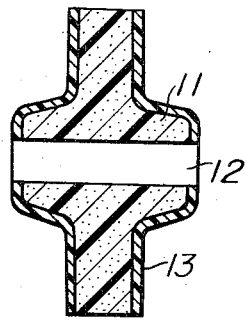
FIG. 3 shows a longitudinal sectional view of a spacer for gas filled-type circuit breaker, the surface of which is coated with the epoxy resin composition of this invention.

The resulting composition was coated by means of an air spray gun on a spacer for gas filled-type circuit breaker shown in FIG. 3. The coated composition was semi-cured at room temperature for 24 hours and then hardened at 130° C. for 6 hours.

In FIG. 3, 11 is a spacer basis material composed of an epoxy resin filled with silica, 12 is a hole through which a conductor passes and 13 is the coating formed from the above-said composition. The coating obtained was uniform without pinholes and had a thickness of $350\mu$. The spacer was built in a practical $SF_6$-filled circuit breaker and examined for its surface resistivity after having repeated 30 times cut-off of a 17 ka.-current. The resistivity was found to be greater than $10^5$ m$\Omega$, showing deterioration insignificant for practical use. For comparison, an uncoated spacer was tested in the same manner. The circuit breaker showed dielectric breakdown after fifth cut-off. Surface creepage was observed on the spacer, which was brought about by corrosion of the surface.

Example 3

Two samples of each of the three kinds of tubes measuring 100 mm. in outer diameter, 250 mm. in length, and 20 mm. in wall thickness, made of a talc-filled epoxy resin, a silica-filled epoxy resin and a glass-filled polyester resin, respectively, were dip-coated with a coating composition of Example 1 and with a coating composition of Example 2. Each of the coated tubes was semi-cured at room temperature for 24 hours, coated again with the respective composition and then heat-cured at 130° C. for 4 hours. For comparison, another coating composition was prepared using the same epoxy resin as in Example 1, filled with 20% by weight of magnesium fluoride but without alumina, and applied on another sample of the said three kinds of tubes in the same manner as mentioned above.

Each of the above-said coated resin tubes was subjected to 20 cycles of thermal treatment, one cycle being $-30°$ C.$\rightarrow$room temperature$\rightarrow +120°$ C. Thereafter, each tube was examined for cracking and peeling of the coated layer. The results obtained were as shown in Table 2.

TABLE 2

| Basis material of resin tube | | Coating of alumina-containing composition | | Coating of alumina-free composition |
| --- | --- | --- | --- | --- |
| Resin | Filler | Example 1 | Example 2 | |
| Epxoy | Talc | All right | All right | Peeling after 10 cycles. |
| Do | Silica | do | do | Cracking after 15 cycles. |
| Polyester | Glass | do | do | Cracking after 8 cycles. |

As is apparent from Table 2, the tubes coated with an alumina-filled resin composition in accordance with the present invention showed no sign of failure after 20 cycles of heat cycling. On the contrary, in the case of the coating of alumina-free composition, cracks were created before completion of 20 cycles of heat cycling, which was presumed to be due to influence of the difference between the thermal expansion coefficient of the basis material and the coating. It is to be noted that the alumina-filled composition was found in other tests to improve electrical properties, particularly arc resistance.

What is claimed is:

1. An epoxy resin composition comprising 100 parts by weight of a glycidyl ether of bisphenol A having an 1. epoxy equivalent of 100 to 200 and a molecular weight of 200 to 400, an effective amount of an amine compound as a hardener for said epoxy resin, 50 to 150 parts by weight of an inorganic filler having a particle diameter of 100µ or less, 0.2 to 5 parts by weight of a thixotropic agent, and 5 to 60 parts by weight of magnesium fluoride having a particle diameter of 100µ or less.

2. An epoxy resin composition according to claim 1, wherein said filler is of at least one member selected from the group consisting of alumnia, zinc oxide, titanium oxide, barium sulfate, iron oxides, aluminum fluoride, magnesium fluoride, calcium fluoride, calcium sulfate, and calcium carbonate.

3. An epoxy resin composition according to claim 1, wherein the amine compound is a boron trifluoride-amine complex compound.

4. An epoxy resin composition according to claim 3, wherein a solvent for the epoxy resin is added to keep the viscosity of the resulting composition at 20 poises or less, said solvent having a relative rate of evaporation of 0.3 to 6.0, the rate of evaporation of n-butyl acetate being assumed to be 1.

5. An epoxy resin composition according to claim 3, wherein 40 parts by weight or less of a cycloaliphatic epoxy resin having an epoxy equivalent of 50 to 200 and a molecular weight of 100 to 400 per 100 parts by weight of the glycidyl ether of bisphenol A is incorporated therein.

6. An epoxy resin composition comprising 100 parts by weight of a glycidyl ether of bisphenol A, an effective amount of a boron trifluoride-amine complex compound as a hardener for said epoxy resin, 50 to 150 parts by weight of at least one filler having a particle diameter of 100µ or less selected from the group consisting of alumina, zinc oxide, titanium oxide, barium sulfate, iron oxide, aluminum fluoride, calcium fluoride, calcium sulfate and calcium carbonate, 0.2 to 5 parts by weight of a thixotropic agent and 5 to 60 parts by weight of magnesium fluoride having a particle size of 100µ or less.

7. An epoxy resin composition according to claim 6, wherein said thixotropic agent is at least one member selected from the group consisting of amide compounds, organic bentonites, and aluminum stearate.

8. An epoxy resin composition according to claim 6, which further contains a solvent for the epoxy resin having a relative rate of evaporation of 0.3 to 6.0, the rate of evaporation of n-butyl acetate being assumed to be 1.

9. An epoxy resin composition according to claim 6, which further contains a cycloaliphatic epoxy resin having an epoxy equivalent of 50 to 200 and a molecular weight of 100 to 400 in an amount up to 40 parts by weight per 100 parts by weight of the glycidyl ether of bisphenol A.

10. An epoxy resin composition comprising 100 parts by weight of a glycidyl ether of bisphenol A having an epoxy equivalent of 100 to 200 and a molecular weight of 200 to 400, 3 to 15 parts by weight of a boron trifluoride-amine complex compound as a hardner for said epoxy resin, 50 to 150 parts by weight of an inorganic filler having a particle diameter of 100µ or less, 0.2 to 5 parts by weight of a thixotropic agent, and 5 to 60 parts by weight of magnesium fluoride having a particle diameter of 100µ or less.

11. An epoxy resin composition according to claim 10, wherein said thixotropic agent is at least one member selected from the group consisting of amide compounds, organic bentonites, and aluminum stearate.

12. An epoxy resin composition according to claim 10, wherein said filler is at least one member selected from the group consisting of alumina, zinc oxide, titanium oxide, barium sulfate, iron oxide, aluminum fluoride, calcium sulfate and calcium carbonate.

References Cited

UNITED STATES PATENTS

| | | | |
|---|---|---|---|
| 3,293,322 | 12/1966 | Pennino | 260—37 EP X |
| 3,318,995 | 5/1967 | Buckley et al. | 260—37 EP UX |
| 3,339,013 | 8/1967 | Gainer et al. | 260—37 EP X |

LEWIS T. JACOBS, Primary Examiner

U.S. Cl. X.R.

260—830 TW